US011927125B2

(12) United States Patent
Oka et al.

(10) Patent No.: US 11,927,125 B2
(45) Date of Patent: Mar. 12, 2024

(54) PREDICTION DEVICE, PREDICTION METHOD, AND WORK VEHICLE

(71) Applicant: Komatsu Ltd., Tokyo (JP)

(72) Inventors: Akira Oka, Tokyo (JP); Tatsuya Yamakawa, Tokyo (JP); Yohei Nishikawa, Tokyo (JP)

(73) Assignee: Komatsu Ltd., Tokyo (JP)

( * ) Notice: Subject to any disclaimer, the term of this patent is extended or adjusted under 35 U.S.C. 154(b) by 78 days.

(21) Appl. No.: 17/611,246

(22) PCT Filed: Jul. 16, 2020

(86) PCT No.: PCT/JP2020/027707
§ 371 (c)(1),
(2) Date: Nov. 15, 2021

(87) PCT Pub. No.: WO2021/010441
PCT Pub. Date: Jan. 21, 2021

(65) Prior Publication Data
US 2022/0213825 A1 Jul. 7, 2022

(30) Foreign Application Priority Data
Jul. 18, 2019 (JP) .................................. 2019-133069

(51) Int. Cl.
*F01N 3/20* (2006.01)
(52) U.S. Cl.
CPC .......... *F01N 3/208* (2013.01); *F01N 2590/08* (2013.01); *F01N 2610/105* (2013.01);
(Continued)

(58) Field of Classification Search
CPC ......... Y02A 50/20; Y02T 10/12; Y02T 10/40; F01N 2590/08; F01N 2610/02;
(Continued)

(56) References Cited

U.S. PATENT DOCUMENTS

2015/0308315 A1 10/2015 Faied et al.
2016/0123204 A1* 5/2016 Furesawa ................ F01N 3/208
60/274
2016/0282167 A1 9/2016 Landwehr et al.

FOREIGN PATENT DOCUMENTS

DE 102015215395 * 2/2017
JP 2013-147982 * 8/2013
(Continued)

*Primary Examiner* — Sizo B Vilakazi
*Assistant Examiner* — Diem T Tran
(74) *Attorney, Agent, or Firm* — Locke Lord LLP

(57) ABSTRACT

A prediction device that predicts time for a reducing agent accommodated in a container mounted on a work vehicle to freeze includes a remaining amount information acquisition unit configured to acquire remaining amount information indicating a remaining amount of the reducing agent in the container, a wall surface temperature acquisition unit configured to acquire a detection result of a wall surface temperature of the container, a reducing agent temperature acquisition unit configured to acquire a detection result of a temperature of the reducing agent, and a time calculation unit configured to calculate the time for the reducing agent to freeze based on the wall surface temperature, the reducing agent temperature, and the remaining amount information.

14 Claims, 12 Drawing Sheets

(52) U.S. Cl.
CPC ............. *F01N 2610/1406* (2013.01); *F01N 2610/1486* (2013.01); *F01N 2900/0422* (2013.01); *F01N 2900/1811* (2013.01); *F01N 2900/1814* (2013.01)

(58) Field of Classification Search
CPC ....... F01N 2610/105; F01N 2610/1406; F01N 2610/142; F01N 2610/1486; F01N 2900/0422; F01N 2900/1806; F01N 2900/1811; F01N 2900/1814; F01N 3/208; F01N 9/00
See application file for complete search history.

(56) References Cited

FOREIGN PATENT DOCUMENTS

| | | |
|---|---|---|
| JP | 2013-147982 A | 8/2013 |
| WO | 2014/199778 A1 | 12/2014 |

\* cited by examiner

SHAPE CHARACTERISTIC TABLE

| REMAINING AMOUNT(%) OF REDUCING AGENT | MASS (kg) OF REDUCING AGENT | CONTACT SURFACE AREA ($m^2$) OF TANK | CONTACT SURFACE AREA ($m^2$) OF HEATER TUBE |
|---|---|---|---|
| 0 | 0 | 0 | 0 |
| 10 | 4.9 | 1 | 1 |
| 20 | 9.8 | 2 | 2 |
| 30 | 14.7 | 3 | 3 |
| ... | ... | ... | ... |
| 100 | 49 | 10 | 10 |

PREDICTION DEVICE, PREDICTION METHOD, AND WORK VEHICLE

TECHNICAL FIELD

The present invention relates to a prediction device, a prediction method, and a work vehicle.

Priority is claimed on Japanese Patent Application No. 2019-133069, filed Jul. 18, 2019, the content of which is incorporated herein by reference.

BACKGROUND ART

In an exhaust gas regulation Tier 4 Final generation construction machine, a diesel exhaust fluid (DEF) (AUS32 JIS K2247) is used as a reducing agent for selective catalytic reduction (SCR). The DEF is stored in an in-vehicle tank, but in a cold region, for example, there is a problem in that the DEF freezes while an engine of the construction machine is stopped. When the engine of the construction machine is started, a thawing device, such as a heater for thawing mounted in the tank, is activated, and the frozen DEF can be thawed, but thawing takes time. Therefore, for example, when the engine is started, an output is limited, a work by the construction machine is limited, and waiting time occurs.

Patent Document 1 discloses a system that decides a change rate of a coolant temperature based on a coolant temperature of an engine and an ambient temperature of a reducing agent tank, predicts thawing time of a filling valve of the reducing agent tank based on the change rate and notifies an operator that filling of a reducing agent is prepared when the thawing prediction time is completed.

CITATION LIST

Patent Document

[Patent Document 1]
Specification of United States Patent Application, Publication No. 2016/0282167

SUMMARY OF INVENTION

Technical Problem

With the system disclosed in Patent Document 1, the thawing time of the filling valve into the reducing agent tank is predicted, and the operator is notified that the predicted thawing time is completed. However, the system disclosed in Patent Document 1 does not predict the time for freezing or the time required for thawing in a case in which the reducing agent stored in the reducing agent tank may freeze or in a case in which the reducing agent freezes. For example, when the time for freezing or the time required for thawing can be predicted in advance, it is possible to formulate a work plan in anticipation of the time or take measures such as moving a chassis to a position having low freezing possibility.

The present invention has been made in view of the above circumstances, and an object of the present invention is to provide a prediction device, a prediction method, and a work vehicle, which can predict the time for the reducing agent to freeze or the time required for thawing the reducing agent.

Solution to Problem

In order to achieve the object described above, an aspect of the present invention relates to a prediction device that predicts time for a reducing agent accommodated in a container mounted on a work vehicle to freeze, the device including a remaining amount information acquisition unit configured to acquire remaining amount information indicating a remaining amount of the reducing agent accommodated in the container, a wall surface temperature acquisition unit configured to acquire a wall surface temperature detection value that is a detection result of a wall surface temperature of the container, a reducing agent temperature acquisition unit configured to acquire a reducing agent temperature detection value that is a detection result of a temperature of the reducing agent, and a time calculation unit configured to calculate the time for the reducing agent to freeze based on the wall surface temperature detection value, the reducing agent temperature detection value, and the remaining amount information.

Advantageous Effects of Invention

According to the aspect described above, it is possible to predict the time for the reducing agent to freeze or the time required for thawing the reducing agent.

DESCRIPTION OF EMBODIMENTS

Figure 1:
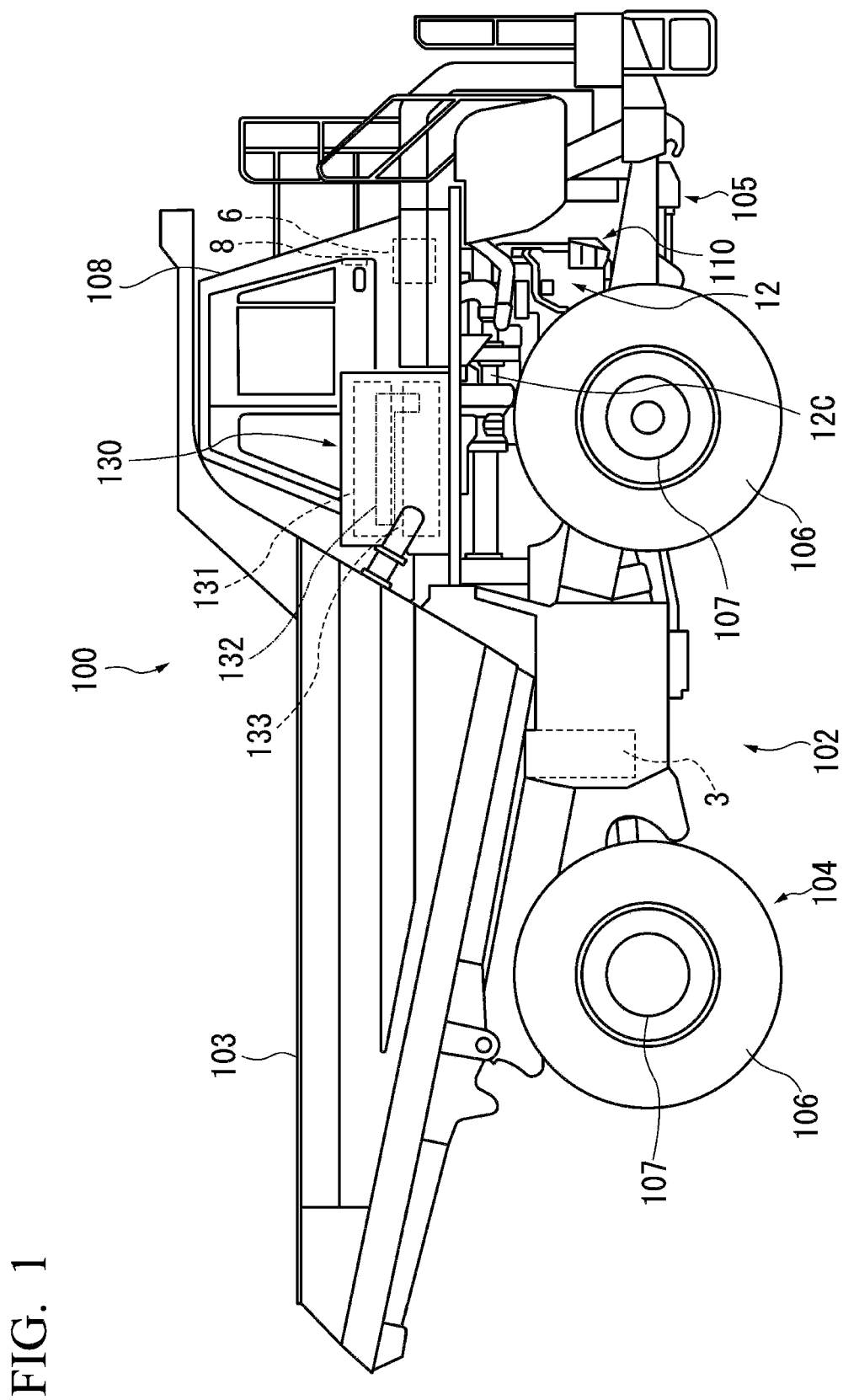
FIG. 1 is a side view showing a work vehicle according to the present embodiment.

Embodiments of the present invention will be described below with reference to drawings. In addition, in each drawing, the same reference numerals are used for the same or corresponding configurations, and the description thereof will be omitted as appropriate.

First Embodiment

FIG. 1 is a side view showing a work vehicle according to a first embodiment of the present invention. In an example shown in FIG. 1, the work vehicle according to the first embodiment is a dump truck 100. In the present embodiment, the dump truck 100 is a manned dump truck operated by a driver (operator) getting on a cab (driver's cab) 108, but is not limited to this, and may be an unmanned dump truck. Further, in the present embodiment, for example, the dump truck 100 is a rigid type dump truck 100, but is not limited to this, and may be a transport vehicle such as an articulated type dump truck.

The dump truck 100 includes a vehicle body 102 and a dump body 103 provided on the vehicle body 102. The vehicle body 102 includes a travel device 104 and a chassis 105 supported by the travel device 104. The travel device 104 includes wheels 106 and axles 107 that rotatably support the wheels 106.

In addition, the chassis 105 includes a power generation device 110. The power generation device 110 generates power to drive the travel device 104. The power generation device 110 includes an engine 12. In the present embodiment, the engine 12 is a diesel engine. The engine 12 includes an exhaust pipe 12C. The exhaust pipe 12C is connected to a diesel particulate filter (DPF) device 131 of an exhaust gas aftertreatment device 130.

The exhaust gas aftertreatment device 130 includes the DPF device 131, a mixing device 132, and a selective catalytic reduction (SCR) device 133. The DPF device 131 removes fine particles such as soot in an exhaust gas. The mixing device 132 mixes the exhaust gas discharged from the DPF device 131 with urea water as a reducing agent and delivers the mixture to the SCR device 133. The mixed urea water is hydrolyzed to generate ammonia in the mixing device 132. The exhaust gas and the generated ammonia are delivered to the SCR device 133. The mixing device 132 includes a supply pipe and an injector, which are not shown, connected to a reducing agent tank 3. The reducing agent tank 3 stores the urea water to be supplied to the mixing device 132. The reducing agent tank 3 mounted on the work vehicle is a container that accommodates the urea water as the reducing agent. In addition, in the present embodiment, the exhaust gas aftertreatment device 130 of the dump truck 100 as the work vehicle is equipped with both the DPF device 131 and the SCR device 133, but the exhaust gas aftertreatment device 130 may be equipped with the SCR device 133 without the DPF device 131.

The SCR device 133 includes a reducing catalyst, and the reducing catalyst causes a catalytic reaction between nitrogen oxide (NOx) contained in the exhaust gas and the ammonia generated in the mixing device 132. As the reducing catalyst, for example, a vanadium-based catalyst, a zeolite-based catalyst, or the like is used. The NOx contained in the exhaust gas is converted into nitrogen and water by the catalytic reaction with the ammonia, which is the reducing agent. In addition, in the present embodiment, both the urea water and the ammonia are referred to as the reducing agent.

The cab 108 includes a controller 6 and a monitor 8. The controller 6 is a prediction device that predicts time for the urea water (reducing agent) accommodated in the reducing agent tank 3 of the dump truck 100 to freeze or predicts time for the urea water to be heated and thawed by a heater tube (heating unit) installed in the reducing agent tank 3 in a case in which the urea water accommodated in the reducing agent tank 3 freezes. The monitor 8 displays a prediction result by the controller 6. For example, the monitor 8 displays the time for the urea water to freeze or a temporal change of a temperature of the urea water or displays the time for the urea water to be thawed or the temporal change of the temperature of the urea water.

Figure 2:
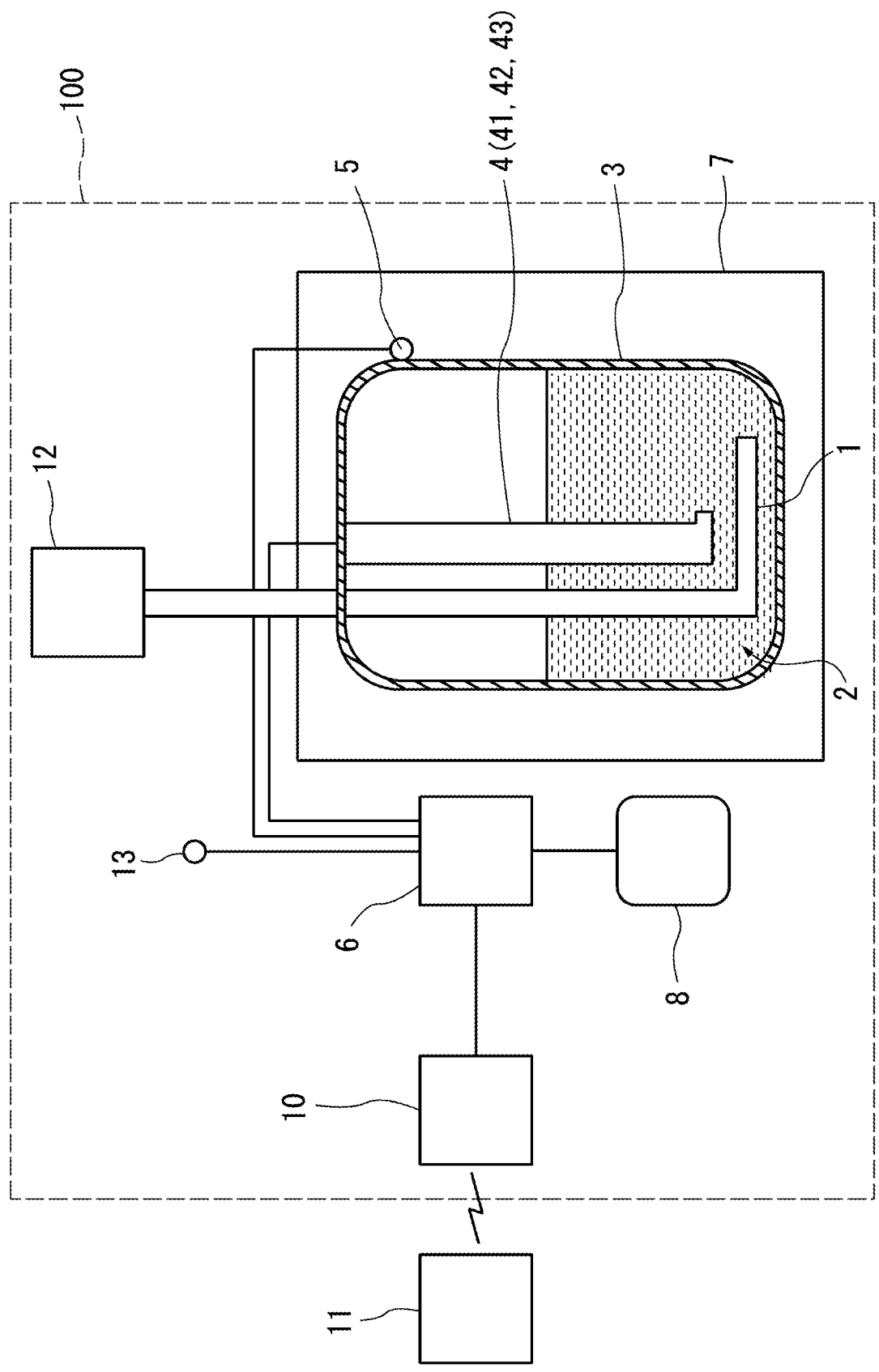
FIG. 2 is a system configuration diagram related to a controller 6 shown in FIG. 1.

Next, a configuration related to the input and output of the controller 6 will be described with reference to FIG. 2. FIG. 2 is a system configuration diagram related to the controller 6 shown in FIG. 1. In addition, in an example shown in FIG. 2, a heater tube 1 and a sensor module 4 are installed inside the reducing agent tank 3 that accommodates urea water 2 (hereinafter referred to as a reducing agent 2). A coolant (warm water) of the engine 12 circulates in the heater tube 1 to heat the reducing agent 2. The sensor module 4 includes a concentration sensor 41, a remaining amount sensor 42, and a reducing agent temperature sensor 43. The concentration sensor 41 detects a concentration of the reducing agent 2 and outputs a detection result to the controller 6. The remaining amount sensor 42 detects a remaining amount of the reducing agent 2 (for example, a ratio (%) with respect to a full tank) and outputs a detection result to the controller 6. The reducing agent temperature sensor 43 detects a temperature of the reducing agent 2 and outputs a detection result to the controller 6. In addition, the reducing agent tank 3 is covered with a tank cover 7. In addition, a wall surface temperature sensor 5 is provided in the tank cover 7. The wall surface temperature sensor 5 detects a wall surface temperature of the reducing agent tank 3 and outputs a detection result to the controller 6. As the wall surface temperature sensor 5, a thermocouple sensor can be used, and a heat flow sensor may also be used. The heat flow sensor is a sensor that outputs an electric signal in response to an amount and a direction of a heat flow, and is, for example, configured by using a thermopile.

The concentration sensor 41, the remaining amount sensor 42, the reducing agent temperature sensor 43, the wall surface temperature sensor 5, the monitor 8, an antenna 10, an outside air temperature sensor 13, and a control unit of the engine 12 (not shown) are connected to the controller 6. The outside air temperature sensor 13 is installed at a predetermined position of the vehicle body 102, which is not easily affected by a heat source such as the engine 12, detects an outside air temperature, and outputs a detection result to the controller 6. The monitor 8 is a display device. Alternatively, the monitor 8 may be an input display device such as a touch panel including a display surface and an operation surface. The antenna 10 is used for performing wireless communication with a server 11 installed at a position away from the dump truck 100. The server 11 is a control device in which an administrator or the like monitors (manages) an operation state of each unit of the dump truck 100 and performs a remote operation.

Figure 3:
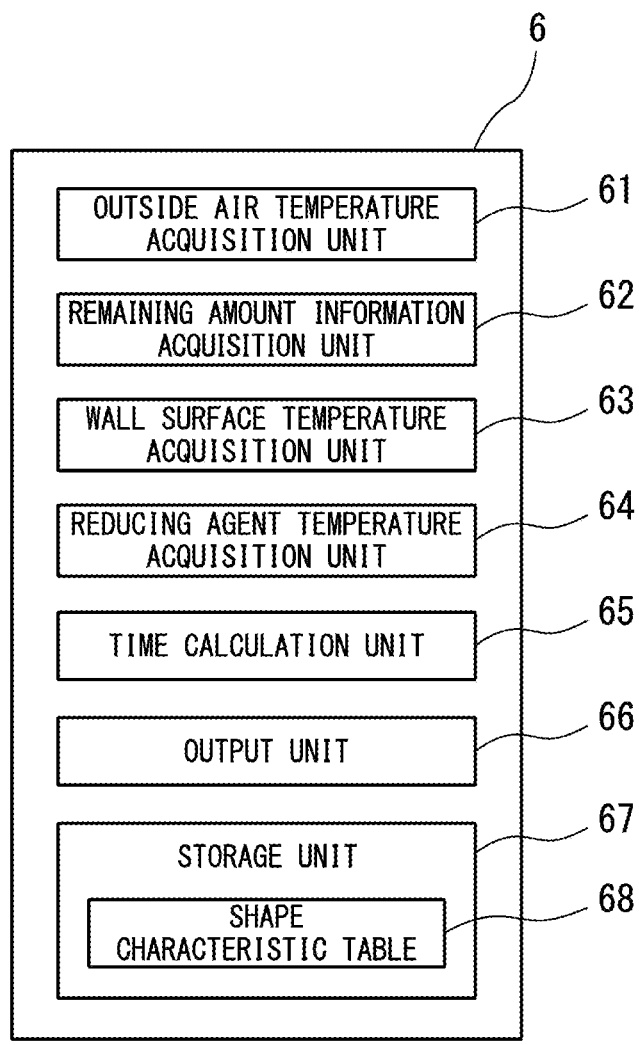
FIG. 3 is a block diagram showing a configuration example of the controller 6 shown in FIGS. 1 and 2.

Hereinafter, a configuration example of the controller 6 shown in FIGS. 1 and 2 will be described with reference to FIG. 3. The controller 6 shown in FIGS. 1 and 2 is configured by a computer and peripheral devices thereof (input device, voice output device, and the like). FIG. 3 is a block diagram showing the configuration example of the controller 6 shown in FIGS. 1 and 2, and shows, in blocks, functional components configured by a combination of a hardware such as the computer and the peripheral devices thereof which configure the controller 6 and a software such as a program executed by the computer.

In an example shown in FIG. 3, the controller 6 includes an outside air temperature acquisition unit 61, a remaining amount information acquisition unit 62, a wall surface temperature acquisition unit 63, a reducing agent temperature acquisition unit 64, a time calculation unit 65, an output unit 66, and a storage unit 67. The outside air temperature acquisition unit 61 inputs an output signal of the outside air temperature sensor 13 and acquires the outside air temperature. In addition, the outside air temperature acquisition unit 61 executes a process of comparing the acquired outside air temperature with a freezing point of the reducing agent 2. The remaining amount information acquisition unit 62 inputs an output signal of the remaining amount sensor 42 and acquires the remaining amount (remaining amount information) of the reducing agent in the reducing agent tank 3. In addition, the remaining amount information acquisition unit 62 may input the output signal of the remaining amount sensor 42, may refer to a table or the like in which the output signal of the remaining amount sensor 42 stored in the storage unit 67 and the remaining amount (volume) of the reducing agent are associated with each other, and may acquire the remaining amount information of the reducing agent in the reducing agent tank 3. The wall surface temperature acquisition unit 63 inputs an output signal of the wall surface temperature sensor 5 and acquires the wall surface temperature (wall surface temperature detection value) of the reducing agent tank 3. The reducing agent temperature acquisition unit 64 inputs the output signal of the reducing agent temperature sensor 43 and acquires the reducing agent temperature (reducing agent temperature detection value). The time calculation unit 65 calculates the time for the reducing agent to freeze or calculates the time for the reducing agent to be thawed based on the wall surface temperature detection value, the reducing agent temperature detection value, and the remaining amount information. The output unit 66 outputs the time for the reducing agent to freeze, which is calculated by the time calculation unit 65 or the time for the reducing agent to be thawed, and the temporal change of the temperature of the reducing agent to the monitor 8 or the like. The storage unit 67 stores a shape characteristic table 68, characteristic information (freezing point temperature, specific heat, latent heat, density, and the like of the reducing agent 2) (not shown) of the reducing agent 2, characteristic information (mass, specific heat, surface area, and the like of the reducing agent tank 3) of the reducing agent tank 3, and the like. In addition, for example, the specific heat of the reducing agent 2 depends on the concentration and the temperature of the reducing agent 2, and thus the specific heat of the reducing agent 2 can be represented by an array (table) including the concentration and the temperature as elements. In addition, the freezing point temperature of the reducing agent 2 depends on the concentration of the reducing agent 2, and thus the freezing point temperature of the reducing agent 2 can be represented by an array (table) including the concentration of the reducing agent 2 as an element.

Figure 4:
FIG. 4 is a schematic diagram showing a configuration example of a shape characteristic table 68 shown in FIG. 3.

Here, a configuration example of the shape characteristic table 68 shown in FIG. 3 will be described with reference to FIG. 4. FIG. 4 is a schematic diagram showing a configuration example of the shape characteristic table 68 shown in FIG. 3. The shape characteristic table 68 shown in FIG. 4 is configured by an array indicating a correspondence between the remaining amount (%) of the reducing agent, the mass (kg) of the reducing agent, a contact surface area (m$^2$) of the tank, and a contact surface area (m$^2$) of the heater tube. The contact surface area (m$^2$) of the tank is an area of a surface of the reducing agent tank 3 with which the reducing agent 2 comes into contact. The contact surface area (m$^2$) of the heater tube is an area of a surface of the heater tube 1 with which the reducing agent 2 comes into contact. The correspondence between the remaining amount (%) of the reducing agent, the mass (kg) of the reducing agent, the contact surface area (m$^2$) of the tank, and the contact surface area (m$^2$) of the heater tube is decided by a shape of the reducing agent tank 3, a shape of the heater tube 1, and an attachment method to the reducing agent tank 3. By referring to the shape characteristic cable 68 shown in FIG. 4, each value corresponding to the remaining amount (%) of the reducing agent (the mass (kg) of the reducing agent, the contact surface area (m$^2$) of the tank, and the contact surface area (m$^2$) of the heater tube) can be acquired.

Figure 5:
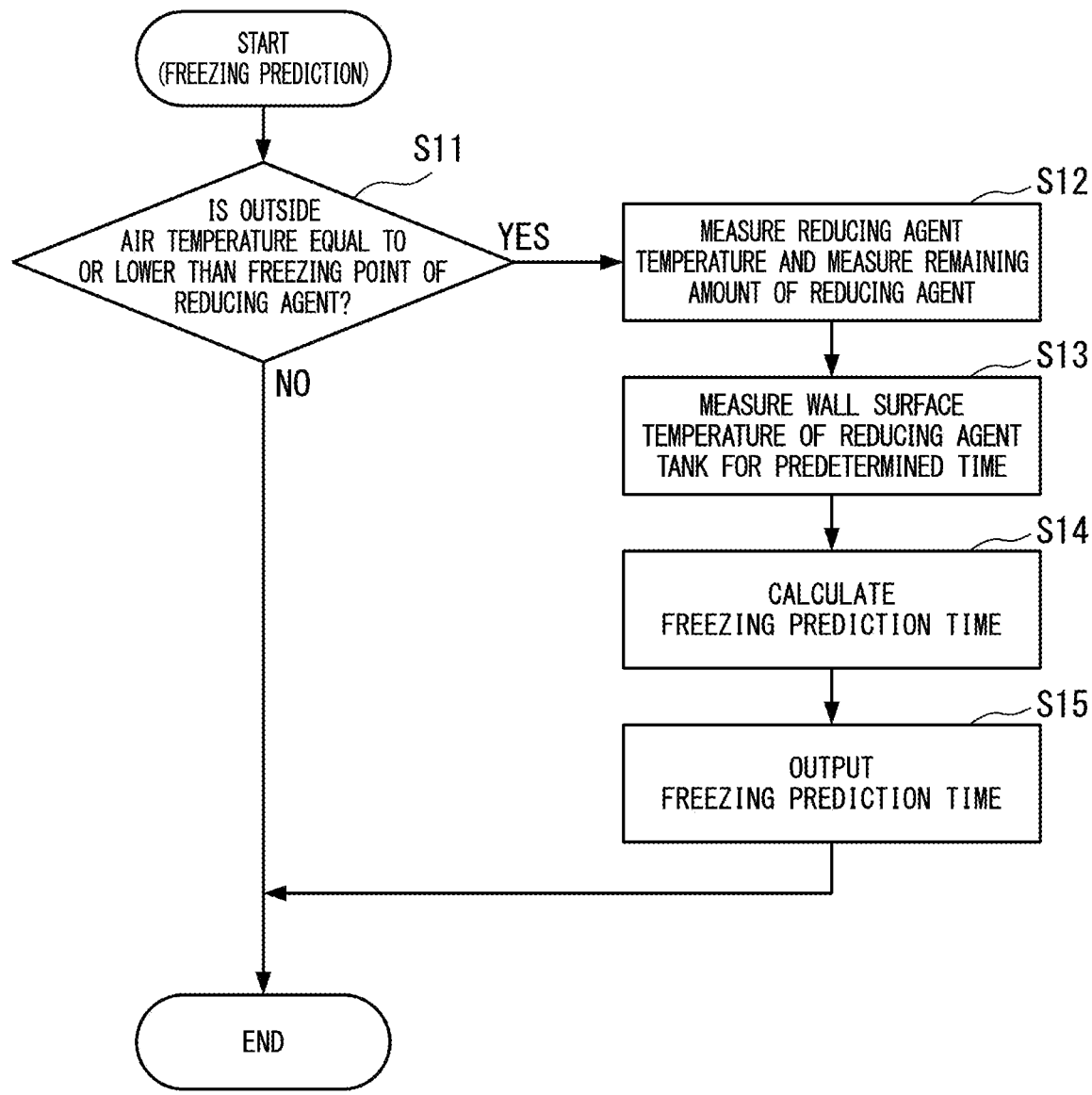
FIG. 5 is a flowchart showing an operation example of the controller 6 shown in FIG. 3.

Next, an operation example of the controller 6 will be described with reference to FIG. 5. FIG. 5 is a flowchart showing the operation example in a case in which the controller 6 shown in FIG. 3 predicts freezing time. A process shown in FIG. 5 is started in a case in which, for example, the operator performs a predetermined input operation with respect to the controller 6 in a state in which the coolant (warm water) does not circulate in the heater tube 1. In addition, in a case in which the dump truck 100 is an unmanned dump truck, for example, the controller 6 may be operated by the controller 6 receiving a signal for providing an instruction for the prediction of the freezing time from the server 11 via the antenna 10 by the wireless communication.

In the controller 6, when the process shown in FIG. 5 is started, first, the outside air temperature acquisition unit 61 inputs the output signal of the outside air temperature sensor 13 to acquire the outside air temperature and compares the outside air temperature and the freezing point temperature of the reducing agent 2 (step S11). On the other hand, in a case in which the outside air temperature is not equal to or lower than the freezing point temperature of the reducing agent 2 (in a case of "NO" in step S11), the outside air temperature acquisition unit 61 displays that fact on, for example, the monitor 8, and terminates the process shown in FIG. 5.

On the other hand, in a case in which the outside air temperature is equal to or lower than the freezing point temperature of the reducing agent 2 (in a case of "YES" in step S11), the reducing agent temperature acquisition unit 64 inputs the output signal of the reducing agent temperature sensor 43 to acquire the reducing agent temperature (reducing agent temperature detection value) and the remaining amount information acquisition unit 62 inputs the output signal of the remaining amount sensor 42 to acquire the remaining amount (remaining amount information) of the reducing agent in the reducing agent tank 3 (step S12).

Then, the wall surface temperature acquisition unit 63 inputs the output signal of the wall surface temperature sensor 5 a plurality of times (at least twice) at predetermined time intervals to acquire the wall surface temperature (wall surface temperature detection value) of the reducing agent tank 3 (step S13).

Next, the time calculation unit 65 calculates freezing prediction time of the reducing agent 2 as follows (step S14).

First, the time calculation unit 65 calculates a tank heat flux, which is the amount of heat that crosses a unit area of the reducing agent tank 3 in a unit time, by the following expression (A1). In addition, in a case in which the heat flow sensor is used as the wall surface temperature sensor 5, the value itself detected by the heat flow sensor can be used as the tank heat flux shown on the left side of the following expression (A1).

[Expression 1]

$$\text{Tank heat flux} \left[\frac{J}{m^2 s}\right] = \frac{\text{Change amount of wall surface temperature}\left[\frac{K}{s}\right] \times \text{Mass [kg] of tank} \times \text{Specific heat } [J/kgK] \text{ of tank}}{\text{Surface area } [m^2] \text{ of tank}} \quad (A1)$$

In the expression (A1), a change amount of the wall surface temperature is a temperature change per unit time and is calculated based on results of a plurality of measurements of the wall surface temperature of the reducing agent tank 3, which is acquired in step S13. The mass of the tank, the specific heat of the tank, and the surface area of the tank, which are indicated by the expression (A1), are the mass, the specific heat, and the surface area of the reducing agent tank 3.

Then, the time calculation unit 65 calculates a temperature change per time, which is the temperature change of the reducing agent 2 per unit time, by the following expression (A2).

[Expression 2]

$$\text{Temperature charge per time } [K/s] = \frac{\text{Tank heat flux} \left[\frac{J}{m^2 s}\right] \times \text{Contact surface area } [m^2] \text{ of tank}}{\text{Mass [kg] of reducing agent} \times \text{Specific heat } [J/kgK] \text{ of reducing agent}} \quad (A2)$$

In the expression (A2), the contact surface area of the tank and the mass of the reducing agent are values obtained from the shape characteristic table 68 based on the remaining amount information. As the specific heat of the reducing agent, the specific heat of the reducing agent 2 stored in the storage unit 67 as the characteristic information is read out and used. As the tank heat flux, the tank heat flux obtained by the expression (A1) is used.

Then, the time calculation unit 65 calculates the freezing prediction time (liquid region), which is the time for the temperature of the liquid reducing agent 2 to drop to the freezing point temperature, by the following expression (A3-1).

[Expression 3]

$$\text{Freezing prediction time (liquid region) } [s] = \frac{\text{Reducing agent temperature } [K] - \text{Freezing point temperature } [K] \text{ of reducing agent}}{\text{Temperature change per time } [K/s]} \quad (A3\text{-}1)$$

Figure 7:
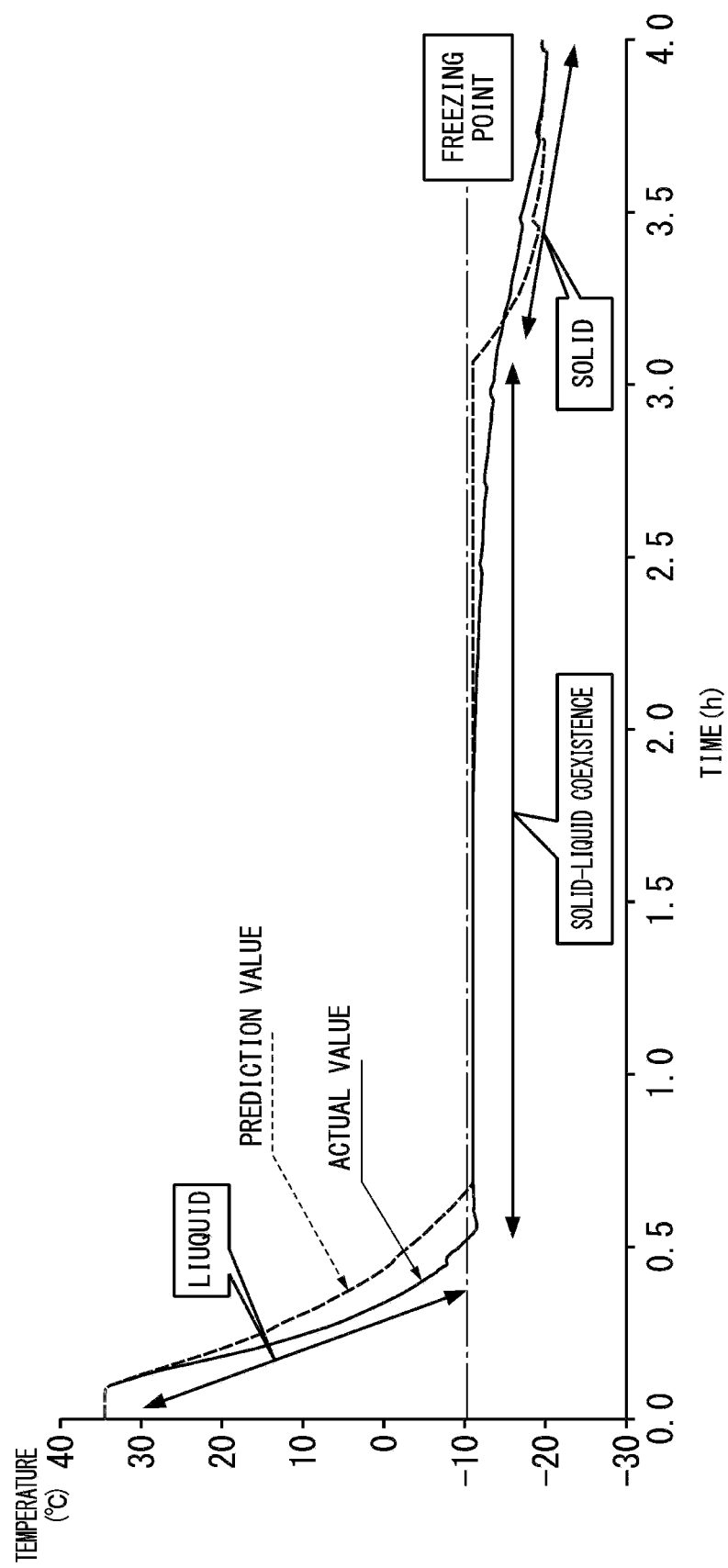
FIG. 7 is a schematic diagram for describing an operation example of the controller 6 shown in FIG. 3.

In the expression (A3-1), the reducing agent temperature is the value acquired in step S12. In addition, the time calculation unit 65 can calculate a temperature drop curve of the reducing agent 2 in the liquid region by an expression {reducing agent temperature at freely-selected time=initial value of reducing agent temperature−(temperature change per time×freely-selected time)}. FIG. 7 shows an example of a prediction value and a measurement value of a temperature drop curve of the reducing agent 2. FIG. 7 is a schematic diagram for describing an operation example of the controller 6 shown in FIG. 3, and a horizontal axis represents the time and a vertical axis represents the temperature of the reducing agent 2, which indicate the temperature change of the reducing agent 2. In an example shown in FIG. 7, the freezing point temperature of the reducing agent 2 is −11° C.

Then, the time calculation unit 65 calculates the freezing prediction time (solid-liquid coexistence region), which is the time during which the reducing agent 2 dropped to the freezing point temperature is maintained in the solid-liquid coexistence region, by the following expression (A3-2). Note that, in the solid-liquid coexistence region, the reducing agent temperature is fixed at the freezing point temperature. As the latent heat of the reducing agent, the latent heat of the reducing agent 2 stored in the storage unit 67 as the characteristic information is read out and used. As the tank heat flux, the tank heat flux obtained by the expression (A1) is used.

[Expression 4]

$$\text{Freezing prediction time (solid−liquid coexistence region) } [s] = \frac{\text{Mass [kg] of reducing agent} \times \text{Latent heat } [J/kg] \text{ of reducing agent}}{\text{Tank heat flux} \left[\frac{J}{m^s s}\right] \times \text{Contact surface area } [m^2] \text{ of tank}} \quad (A3\text{-}2)$$

Then, the time calculation unit 65 calculates the freezing prediction time (solid region), which is the time required for the temperature of the solid reducing agent 2 to drop to an any reducing agent temperature, by the following expression (A3-3).

[Expression 5]

$$\text{Freezing prediction time (solid region) } [s] = \frac{\text{Reducing agent temperature } [K]}{\text{Temperature change per time } [K/s]} \quad (A3\text{-}3)$$

For example, when the reducing agent temperature of the expression (A3-3) is the outside air temperature, the time for the reducing agent temperature to drop to the outside air temperature (time for thermal equilibrium with the outside air) can be obtained by the expression (A3-3). In addition, in the time calculation unit 65 can calculate a temperature drop curve of the reducing agent 2 in the solid region by an expression {reducing agent temperature at freely-selected time=freezing point temperature of reducing agent temperature−(temperature change per time×freely-selected time)}.

As shown in FIG. 7, the freezing prediction time calculated in the present embodiment is a value roughly close to an actual measurement value in the liquid region, the solid-liquid coexistence region, and the solid region.

Next, the output unit 66 outputs the freezing prediction time calculated in step S14 to the monitor 8, and terminates the process shown in FIG. 5 (step S15). The freezing prediction time to be output may be, for example, only the freezing prediction time (liquid region), or may be all or part of the freezing prediction time (liquid region), the freezing prediction time (solid-liquid coexistence region), and the freezing prediction time (solid region).

Figure 6:
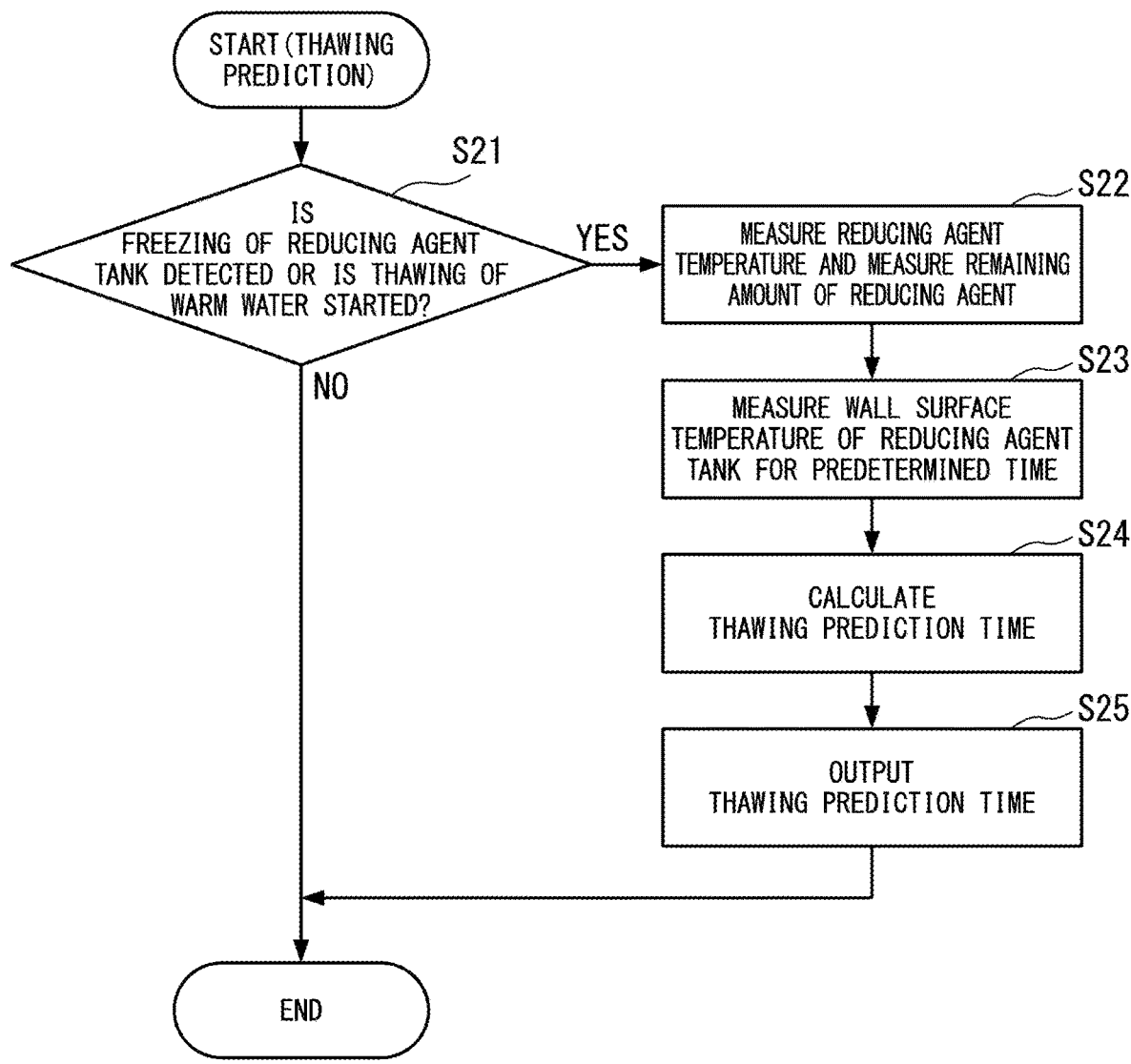
FIG. 6 is a flowchart showing another operation example of the controller 6 shown in FIG. 3.

Next, another operation example of the controller 6 will be described with reference to FIG. 6. FIG. 6 is a flowchart showing an operation example in a case in which the controller 6 shown in FIG. 3 predicts thawing time. A process shown in FIG. 6 is started in a case in which, for example, the operator performs a predetermined input operation with respect to the controller 6 in a state in which the circulation of the coolant (warm water) in the heater tube 1 is started.

In the controller 6, when the process shown in FIG. 6 is started, first, the reducing agent temperature acquisition unit 64 determines whether or not freezing of the reducing agent tank 3 is detected and the circulation of the coolant (warm water) in the heater tube 1 is started, based on, for example, the information obtained from the control unit and the like of the engine 12 (step S21). On the other hand, in a case in which freezing of the reducing agent tank 3 is not detected or the circulation of the coolant (warm water) in the heater tube 1 is not started (in a case of "NO" in step S21), for example, the reducing agent temperature acquisition unit 64 displays that fact on, for example, the monitor 8, and terminates the process shown in FIG. 6.

On the other hand, in a case in which freezing of the reducing agent tank 3 is detected and the circulation of the coolant (warm water) in the heater tube 1 is started (in a case of "YES" in step S21), the reducing agent temperature acquisition unit 64 inputs the output signal of the reducing agent temperature sensor 43 to acquire the reducing agent temperature (reducing agent temperature detection value) and the remaining amount information acquisition unit 62 inputs the output signal of the remaining amount sensor 42 to acquire the remaining amount (remaining amount information) of the reducing agent in the reducing agent tank 3 (step S22).

Then, the wall surface temperature acquisition unit 63 inputs the output signal of the wall surface temperature sensor 5 a plurality of times (at least twice) at predetermined time intervals to acquire the wall surface temperature (wall surface temperature detection value) of the reducing agent tank 3 (step S23).

Next, the time calculation unit 65 calculates thawing prediction time of the reducing agent 2 as follows (step S24).

First, the time calculation unit 65 calculates the tank heat flux, which is the amount of heat that crosses the unit area of the reducing agent tank 3 in a unit time, by the following expression (B1). In addition, in a case in which the heat flow sensor is used as the wall surface temperature sensor 5, the value itself detected by the heat flow sensor can be used as the tank heat flux shown on the left side of the following expression (B1).

[Expression 6]

$$\text{Tank heat flux} \left[\frac{J}{m^2 s}\right] = \frac{\text{Change amount of wall surface temperature}\left[\frac{K}{s}\right] \times \text{Mass [kg] of tank} \times \text{Specific heat } [J/kgK] \text{ of tank}}{\text{Surface area } [m^2] \text{ of tank}} \quad (B1)$$

In the expression (B1), the change amount of the wall surface temperature is the temperature change per unit time and is calculated based on the results of a plurality of measurements of the wall surface temperature of the reducing agent tank 3, which is acquired in step S23. The mass of the tank, the specific heat of the tank, and the surface area of the tank, which are indicated by the expression (B1), are the mass, the specific heat, and the surface area of the reducing agent tank 3.

Then, the time calculation unit 65 calculates the temperature change per time, which is the temperature change of the reducing agent 2 per unit time, by the following expression (B2).

[Expression 7]

$$\text{Temperature change per time } [K/s] = \frac{\left\{\left(HT \text{ heat flux } \left[\frac{J}{m^2 s}\right] \times \text{Contact surface area } [m^2] \text{ of } HT\right) - \left(\text{Tank heat flux } \left[\frac{J}{m^2 s}\right] \times \text{Contact surface area } [m^2] \text{ of tank}\right)\right\}}{\left(\begin{array}{c}\text{Mass [kg] of} \\ \text{reducing agent}\end{array} \times \begin{array}{c}\text{Specific heat } [J/kgK] \text{ of} \\ \text{reducing agent}\end{array}\right)} \quad (B2)$$

In the expression (B2), the contact surface area of the tank, the mass of the reducing agent, and the contact surface area of the heater tube (HT) are values obtained from the shape characteristic table 68 based on the remaining amount information. The heat flux of the heater tube (HT) can be decided, for example, by using an empirical expression or a table set experimentally or by simulation calculation with parameters such as the reducing agent temperature, the coolant temperature, and the coolant flow rate. In addition, as the specific heat of the reducing agent, the specific heat of the reducing agent 2 stored in the storage unit 67 as the characteristic information is read out and used. As the tank heat flux, the tank heat flux obtained by the expression (B1) is used.

Then, the time calculation unit 65 calculates the thawing prediction time (solid region), which is the time required for the temperature of the reducing agent 2 in the solid region to rise by a predetermined reducing agent temperature, by the following expression (B3-1).

[Expression 8]

$$\text{Thawing prediction time (solid region) } [s] = \frac{\text{Reducing agent temperature } [K]}{\text{Temperature change per time } [K/s]} \quad (B3-1)$$

For example, when the reducing agent temperature of the expression (B3-1) is a temperature corresponding to a difference between the current reducing agent temperature and the freezing point temperature, the time required for the temperature to rise to the freezing point temperature can be obtained by the expression (B3-1). In addition, in the time calculation unit 65 can calculate a temperature rise curve of the reducing agent 2 in the solid region by an expression {reducing agent temperature at freely-selected time=reducing agent temperature (initial value)+(temperature change per time×freely-selected time)}.

Then, the time calculation unit 65 calculates the thawing prediction time (solid-liquid coexistence region), which is the time during which the reducing agent 2 rising to the freezing point temperature is maintained in the solid-liquid coexistence region, by the following expression (B3-2). As the tank heat flux, the tank heat flux obtained by the expression (B1) is used. As the latent heat of the reducing agent, the latent heat of the reducing agent 2 stored as characteristic information in the storage unit 67 is read out and used. In addition, in the solid-liquid coexistence region, the reducing agent temperature is assumed to be fixed at the freezing point temperature.

[Expression 9]

$$\text{Thawing prediction time (solid–liquid coexistence region) [s]} = \frac{\text{Mass [kg] of reducing agent} \times \text{Latent heat [J/kg] of reducing agent}}{\text{Tank heat flux}\left[\frac{J}{m^2s}\right] \times \text{Contact surface area [m}^2\text{] of tank}} \quad (B3-2)$$

Then, the time calculation unit 65 calculates the thawing prediction time (liquid region), which is the time for the temperature of the liquid reducing agent 2 to rise to a predetermined reducing agent temperature, by the following expression (B3-3).

[Expression 10]

$$\text{Thawing prediction time (liquid region) [s]} = \frac{\text{Reducing agent temperature [K]} \ast \text{Freezing point temperature [K] of reducing agent}}{\text{Temperature change per time [K/s]}} \quad (B3-3)$$

In the expression (B3-3), the reducing agent temperature is a predetermined temperature. By using the expression (B3-3), for example, the time for the liquid reducing agent 2 to be maintained at a fixed temperature (time for an amount of heat obtained from the coolant and an amount of heat taken by the outside air) can be obtained. In addition, in the time calculation unit 65 can calculate the temperature rise curve of the reducing agent 2 in the liquid region by an expression {reducing agent temperature at freely-selected time=freezing point temperature+(temperature change per time×freely-selected time)}.

Next, the output unit 66 outputs the thawing prediction time calculated in step S24 to the monitor 8, and terminates the process shown in FIG. 6 (step S25). The thawing prediction time to be output may be, for example, only the thawing prediction time (solid region), or may be all or part of the thawing prediction time (solid region), the thawing prediction time (solid-liquid coexistence region), and the thawing prediction time (liquid region).

As described above, according to the present embodiment, the time for freezing or the time required for thawing can be predicted in a case in which the reducing agent 2 stored in the reducing agent tank 3 may freeze or in a case in which the reducing agent freezes. Therefore, according to the present embodiment, for example, by predicting the time for freezing or the time required for thawing in advance, it is possible to formulate an operation plan of the work vehicle in anticipation of the time or take measures such as moving the work vehicle to a position having low freezing possibility before the work vehicle is stopped.

Second Embodiment

Figure 8:
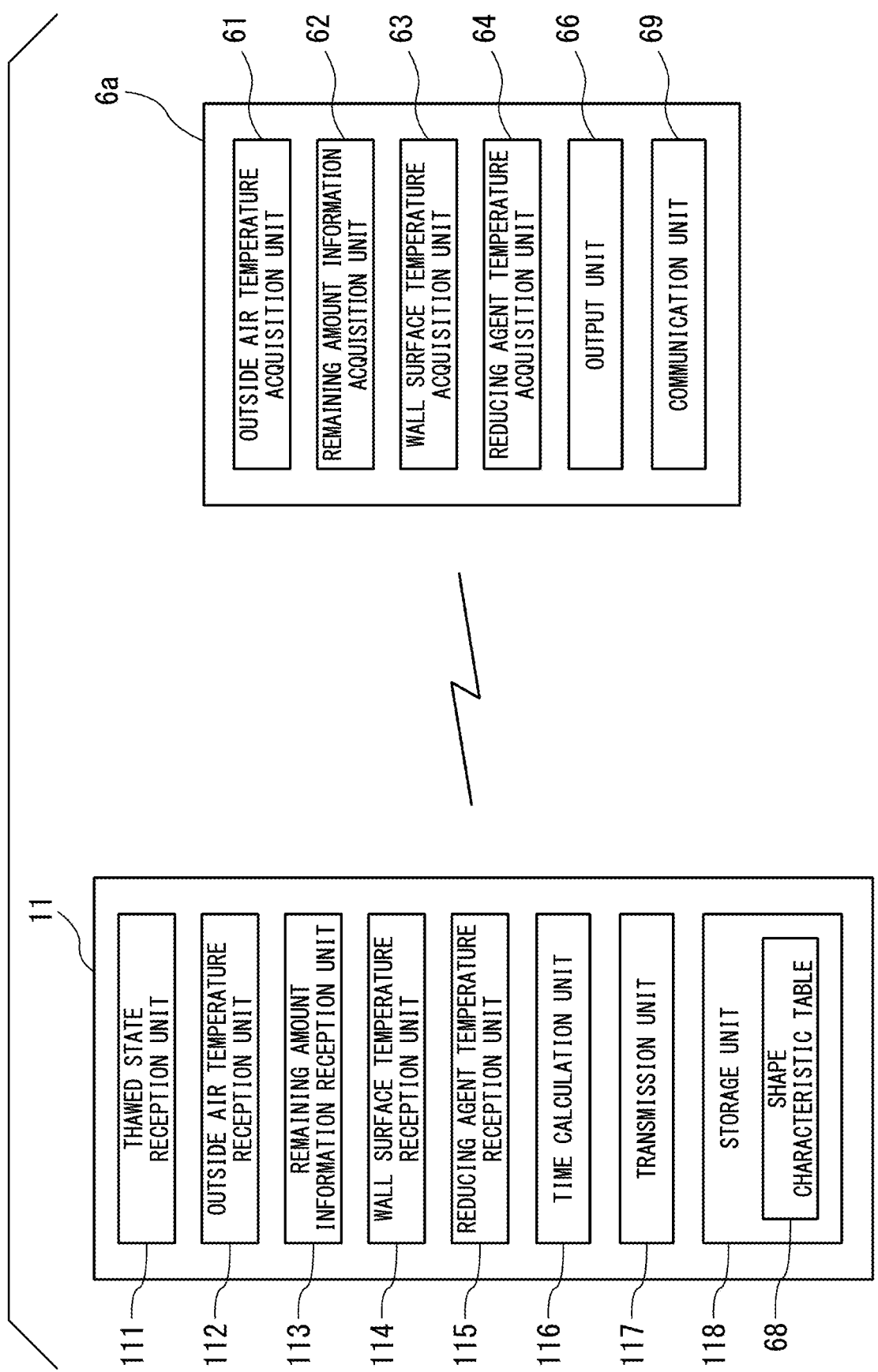
FIG. 8 is a block diagram showing another configuration example of a server 11 and the controller 6 (controller 6*a* in FIG. 8) shown in FIGS. 1 and 2.
Figure 9:
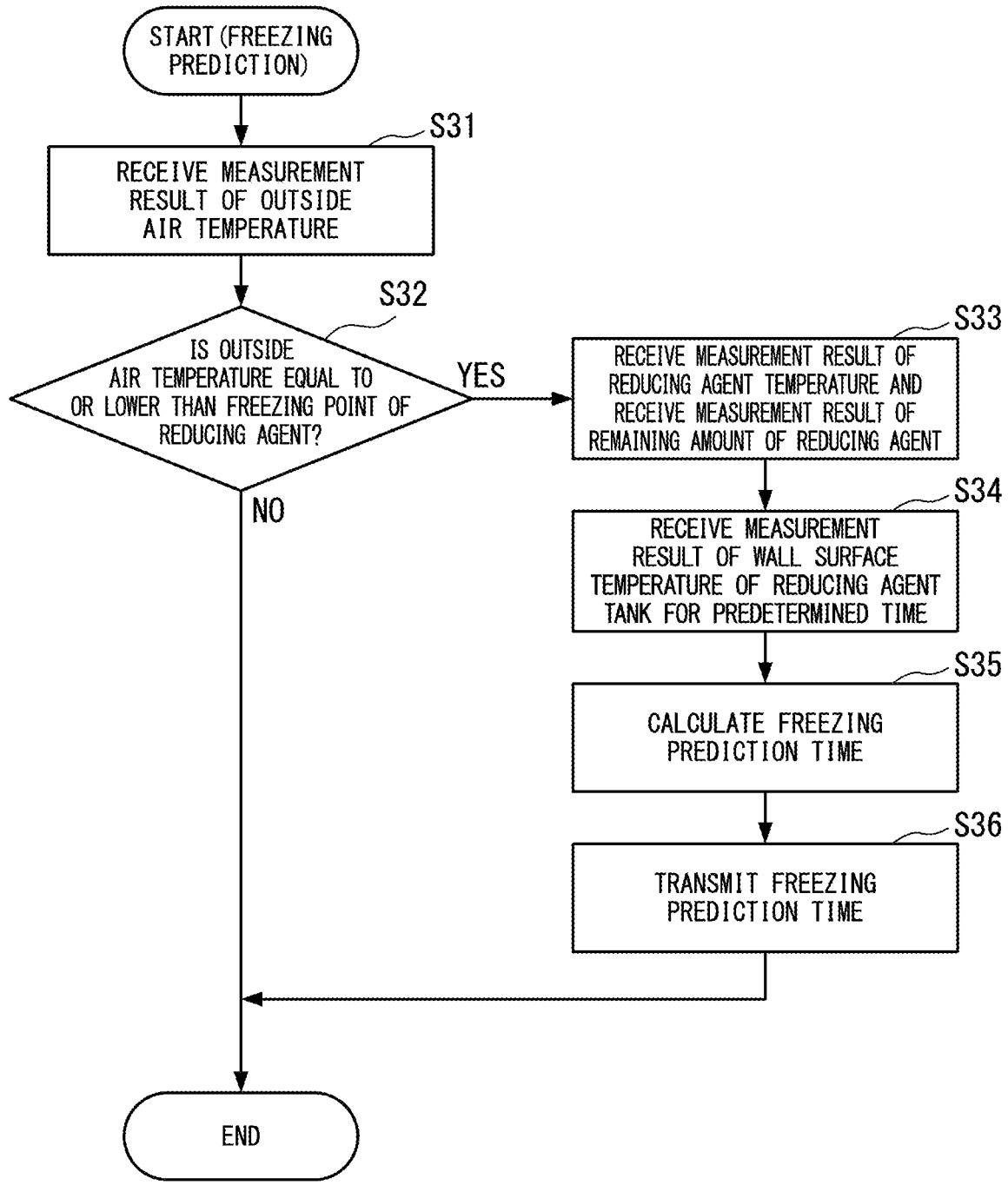
FIG. 9 is a flowchart showing an operation example of the server 11 shown in FIG. 8.
Figure 10:
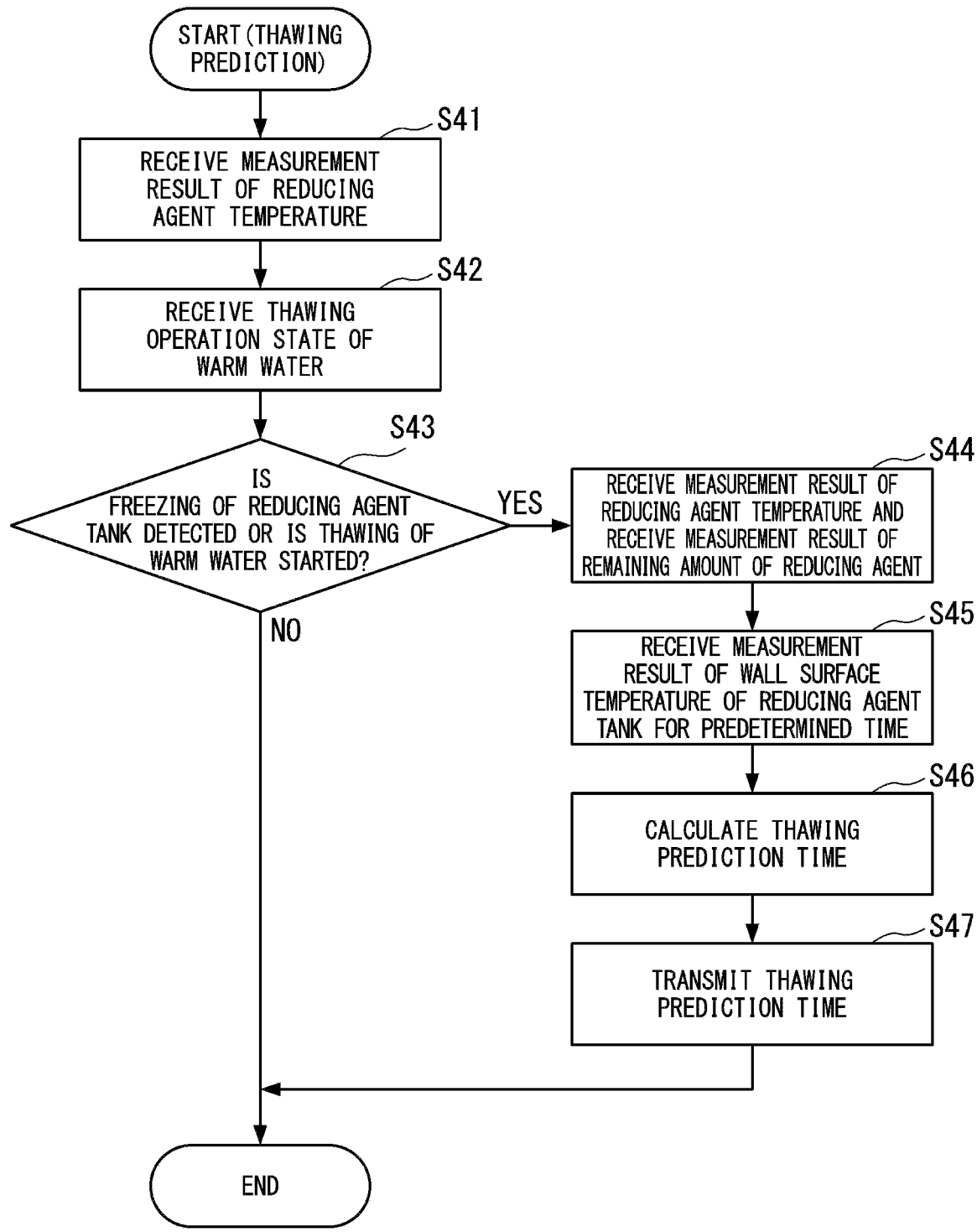
FIG. 10 is a flowchart showing another operation example of the server 11 shown in FIG. 8.

Hereinafter, a second embodiment of the present invention will be described with reference to FIGS. 8 to 10. FIG. 8 is a block diagram showing another configuration example (configuration example according to the second embodiment) of the server 11 and the controller 6 shown in FIGS. 1 and 2 (shown as a controller 6a in FIG. 8). FIG. 9 is a flowchart showing an operation example of the server 11 shown in FIG. 8. FIG. 10 is a flowchart showing another operation example of the server 11 shown in FIG. 8.

In the first embodiment, the controller 6 mounted on the dump truck 100 calculates the freezing prediction time and the thawing prediction time, whereas in the second embodiment, the server 11 calculates the freezing prediction time and the thawing prediction time. The second embodiment will be described below focusing on a difference from the first embodiment.

First, the configuration examples of the server 11 and the controller 6 shown in FIGS. 1 and 2 in the second embodiment (controller 6a) will be described with reference to FIG. 8. The server 11 shown in FIGS. 1 and 2 is configured by a computer and peripheral devices thereof (input device, voice output device, and the like), in the same manner as the controller 6 (controller 6a). FIG. 8 is a block diagram showing the configuration examples of the server 11 and the controller 6a shown in FIGS. 1 and 2, and shows, in blocks, functional components configured by a combination of a hardware such as the computer and the peripheral devices thereof which configure the server 11 and the controller 6a and a software such as a program executed by the computer.

The controller 6a shown in FIG. 8, the time calculation unit 65 and the storage unit 67 are removed and a communication unit 69 is newly provided with respect to the controller 6 shown in FIG. 3. The communication unit 69 transmits the information acquired by the outside air temperature acquisition unit 61, the remaining amount information acquisition unit 62, the wall surface temperature acquisition unit 63, and the reducing agent temperature acquisition unit 64 to the server 11, transmits the information (for example, information indicating whether or not thawing of the warm water is started) acquired from the control unit of the engine 12 to the server 11, or displays the information received from the server 11 on the monitor 8 via the output unit 66.

The server 11 shown in FIG. 8 includes a thawed state reception unit 111, an outside air temperature reception unit 112, a remaining amount information reception unit 113, a wall surface temperature reception unit 114, a reducing agent temperature reception unit 115, and a time calculation unit 116, a transmission unit 117, and a storage unit 118.

The thawed state reception unit 111 receives the information indicating whether or not thawing of warm water is started from the control unit of the engine 12 via the communication unit 69 (or from the control unit of the engine 12 via a predetermined communication unit without using the communication unit 69). The outside air temperature reception unit 112 receives information on the outside air temperature acquired by the outside air temperature acquisition unit 61 from the communication unit 69. The remaining amount information reception unit 113 receives the remaining amount (remaining amount information) of the reducing agent in the reducing agent tank 3, which is acquired by the remaining amount information acquisition unit 62 from the communication unit 69. The wall surface temperature reception unit 114 receives the wall surface temperature (wall surface temperature detection value) of the reducing agent tank 3, which is acquired by the wall surface temperature acquisition unit 63 from the communication unit 69. The reducing agent temperature reception unit 115 receives the reducing agent temperature (reducing agent temperature detection value) acquired by the reducing agent temperature acquisition unit 64 from the communication unit 69. Similar to the time calculation unit 65 according to the first embodiment shown in FIG. 3, the time calculation unit 116 calculates the time for the reducing agent to freeze or calculates the time for the reducing agent to be thawed based on the wall surface temperature detection value, the reducing agent temperature detection value, and the remaining amount information. The transmission unit 117 transmits the time for the reducing agent to freeze or the time for the reducing agent to be thawed, and the temporal change of the temperature of the reducing agent calculated by the time calculation unit 116 to the communication unit 69 of the controller 6a. Similar to the storage unit 67 shown in FIG. 3, the storage unit 118 stores the shape characteristic table 68, the characteristic information (freezing point temperature, specific heat, latent heat, density, and the like of the reducing agent 2) (not shown) of the reducing agent 2, the characteristic information (mass, specific heat, surface area, and the like of the reducing agent tank 3) of the reducing agent tank 3, and the like. In addition, for example, the specific heat of the reducing agent 2 depends on the concentration and the temperature of the reducing agent 2, and thus the specific heat of the reducing agent 2 can be represented by the array (table) including the concentration and the temperature as the elements. In addition, the freezing point temperature of the reducing agent 2 depends on the concentration of the reducing agent 2, and thus the freezing point temperature of the reducing agent 2 can be represented by the array (table) including the concentration of the reducing agent 2 as the element.

Next, the operation example of the server 11 shown in FIG. 8 will be described with reference to FIG. 9. FIG. 9 is a flowchart showing the operation example in a case in which the server 11 shown in FIG. 8 predicts the freezing time. A process shown in FIG. 9 is started in a case in which, for example, the operator of the server 11, such as the administrator, performs a predetermined input operation with respect to the server 11 in a state in which the coolant (warm water) does not circulate in the heater tube 1.

In the server 11, when the process shown in FIG. 9 is started, first, the outside air temperature reception unit 112 receives the outside air temperature acquired by the outside air temperature acquisition unit 61 (step S31). Then, for example, the outside air temperature reception unit 112 compares the outside air temperature with the freezing point temperature of the reducing agent 2 (step S32). On the other hand, in a case in which the outside air temperature is not equal to or lower than the freezing point temperature of the reducing agent 2 (in a case of "NO" in step S32), the outside air temperature reception unit 112 displays that fact on, for example, a predetermined monitor of the server 11, and terminates the process shown in FIG. 9.

On the other hand, in a case in which the outside air temperature is equal to or lower than the freezing point temperature of the reducing agent 2 (in a case of "YES" in step S32), the reducing agent temperature reception unit 115 receives the reducing agent temperature (reducing agent temperature detection value) acquired by the reducing agent temperature acquisition unit 64, and the remaining amount information reception unit 113 receives the remaining amount (remaining amount information) of the reducing agent in the reducing agent tank 3, which is acquired by the remaining amount information acquisition unit 62 (step S33).

Then, the wall surface temperature reception unit 114 receives the wall surface temperature (wall surface temperature detection value) of the reducing agent tank 3, which is acquired a plurality of times (at least twice) at predetermined time intervals by the wall surface temperature acquisition unit 63 (step S34).

Next, the time calculation unit 116 calculates the freezing prediction time of the reducing agent 2 in the same manner as the time calculation unit 65 according to the first embodiment (step S35).

Next, the transmission unit 117 transmits the freezing prediction time calculated in step S35 to the communication unit 69, and terminates the process shown in FIG. 9 (step S36). On the other hand, the communication unit 69 of the controller 6a outputs the received information indicating the freezing prediction time on the monitor 8.

Next, another operation example of the server 11 will be described with reference to FIG. 10. FIG. 10 is a flowchart showing the operation example in a case in which the server 11 shown in FIG. 8 predicts the thawing time. A process shown in FIG. 10 is started in a case in which, for example, the operator of the server 11, such as the administrator, performs a predetermined input operation with respect to the server 11 in a state in which the circulation of the coolant (warm water) in the heater tube 1 is started.

In the server 11, when the process shown in FIG. 10 is started, first, the reducing agent temperature reception unit 115 receives the reducing agent temperature (reducing agent temperature detection value) acquired by the reducing agent temperature acquisition unit 64 (step S41). Then, the thawed state reception unit 111 receives information indicating whether or not the circulation of the coolant (warm water) in the heater tube 1 is started from the control unit of the engine 12 and the like (step S42).

Next, for example, the thawed state reception unit 111 determines whether or not freezing of the reducing agent tank 3 is detected and the circulation of the coolant (warm water) in the heater tube 1 is started, based on the information acquired in step S41 and step S42 (step S43). On the other hand, in a case in which freezing of the reducing agent tank 3 is not detected or the circulation of the coolant (warm water) in the heater tube 1 is not started (in a case of "NO" in step S43), for example, the thawed state reception unit 111 displays that fact on, for example, the predetermined monitor of the server 11, and terminates the process shown in FIG. 10.

On the other hand, in a case in which freezing of the reducing agent tank 3 is detected and the circulation of the coolant (warm water) in the heater tube 1 is started (in a case of "YES" in step S43), the reducing agent temperature reception unit 115 receives the reducing agent temperature (reducing agent temperature detection value) acquired by the reducing agent temperature acquisition unit 64, and the remaining amount information reception unit 113 receives the remaining amount (remaining amount information) of the reducing agent in the reducing agent tank 3, which is acquired by the remaining amount information acquisition unit 62 (step S44).

Then, the wall surface temperature reception unit 114 receives the wall surface temperature (wall surface temperature detection value) of the reducing agent tank 3, which is acquired a plurality of times (at least twice) at predetermined time intervals by the wall surface temperature acquisition unit 63 (step S45).

Next, the time calculation unit 116 calculates the thawing prediction time of the reducing agent 2 in the same manner as the time calculation unit 65 according to the first embodiment (step S46).

Next, the transmission unit 117 transmits the thawing prediction time calculated in step S46 to the communication unit 69, and terminates the process shown in FIG. 10 (step S47). On the other hand, the communication unit 69 of the controller 6a outputs the received information indicating the thawing prediction time on the monitor 8.

As described above, according to the second embodiment, the freezing prediction time or the thawing prediction time of the reducing agent 2 can be predicted on the server 11 side.

Third Embodiment

Figure 11:
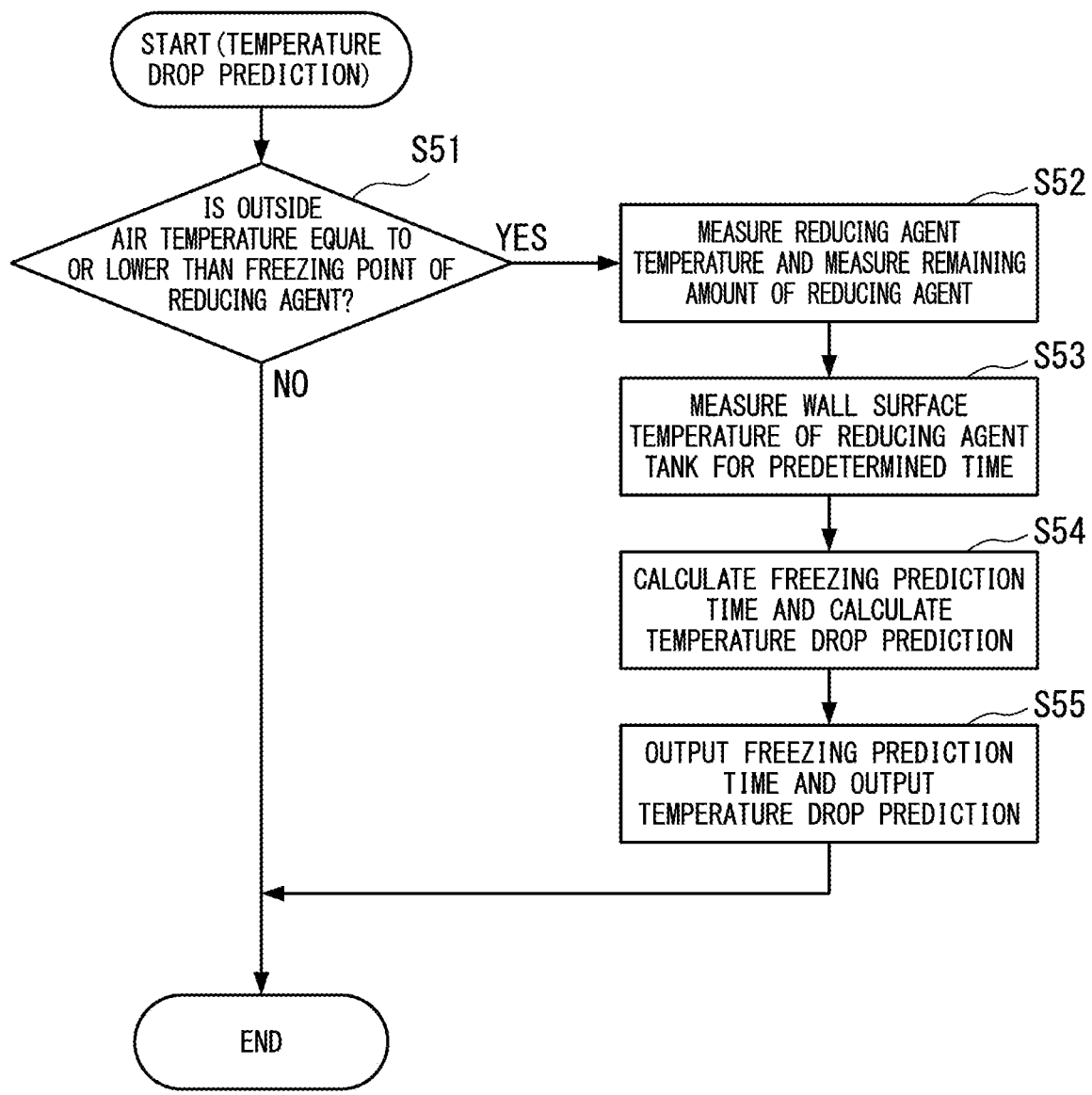
FIG. 11 is a flowchart showing still another operation example of the controller 6 shown in FIG. 3.
Figure 12:
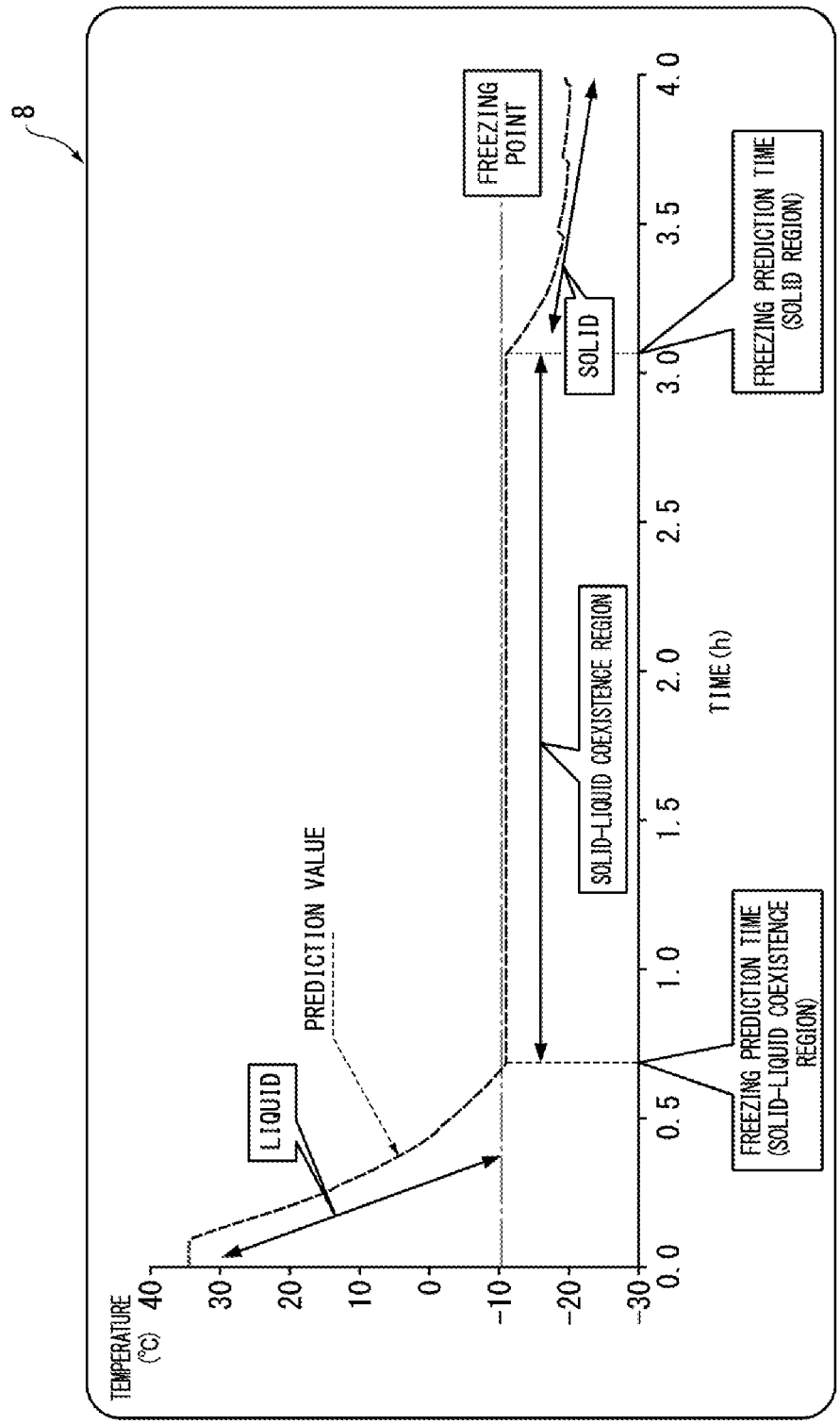
FIG. 12 is a schematic diagram for describing an operation example of the controller 6 shown in FIG. 11.

Hereinafter, a third embodiment of the present invention will be described with reference to FIGS. 11 and 12. FIG. 11 is a flowchart showing still another operation example (operation example of the third embodiment) of the controller 6 shown in FIGS. 1 and 2. FIG. 12 is a schematic diagram for describing still another operation example of the controller 6 shown in FIGS. 1 and 2. In addition, in the third embodiment, part of the operations of the controller 6 is different from that of the first embodiment.

The operation example of the controller 6 according to the third embodiment will be described with reference to FIG. 11. FIG. 11 is a flowchart showing the operation example in a case in which the controller 6 shown in FIG. 3 predicts the freezing time. A process shown in FIG. 11 is started in a case in which, for example, the operator performs a predetermined input operation with respect to the controller 6 in a state in which the coolant (warm water) does not circulate in the heater tube 1.

In the controller 6, when the process shown in FIG. 11 is started, first, the outside air temperature acquisition unit 61 inputs the output signal of the outside air temperature sensor 13 to acquire the outside air temperature and compares the outside air temperature and the freezing point temperature of the reducing agent 2 (step S51). On the other hand, in a case in which the outside air temperature is not equal to or lower than the freezing point temperature of the reducing agent 2 (in a case of "NO" in step S51), the outside air temperature acquisition unit 61 displays that fact on, for example, the monitor 8, and terminates the process shown in FIG. 11.

On the other hand, in a case in which the outside air temperature is equal to or lower than the freezing point temperature of the reducing agent 2 (in a case of "YES" in step S51), the reducing agent temperature acquisition unit 64 inputs the output signal of the reducing agent temperature sensor 43 to acquire the reducing agent temperature (reducing agent temperature detection value) and the remaining amount information acquisition unit 62 inputs the output signal of the remaining amount sensor 42 to acquire the remaining amount (remaining amount information) of the reducing agent in the reducing agent tank 3 (step S52).

Then, the wall surface temperature acquisition unit 63 inputs the output signal of the wall surface temperature sensor 5 a plurality of times (at least twice) at predetermined time intervals to acquire the wall surface temperature (wall surface temperature detection value) of the reducing agent tank 3 (step S53).

Next, the time calculation unit 65 calculates the freezing prediction time of the reducing agent 2 in the same manner as in step S14 of FIG. 5 and calculates the temperature change (information related to temperature drop prediction) of the reducing agent 2 as described above (step S54).

Next, the output unit 66 outputs the freezing prediction time and the temperature drop curve (temporal change of temperature) calculated in step S54 to the monitor 8, for example, as shown in FIG. 12, and terminates the process shown in FIG. 11 (step S55).

According to the present embodiment, more detailed information related to the freezing prediction time can be provided to the operator of the work vehicle, the administrator of the work vehicle, or the administrator of a work site in which the work vehicle is operated.

In the above, the embodiments of the present invention have been described with reference to the drawings, but the specific configuration is not limited to the embodiments described above and includes design changes and the like without departing from the scope of the present invention.

For example, each acquisition unit may be grasped as a functional component, which includes each sensor. In addition, the heat flux represented by the expression (A1) and the expression (B1) may be measured and obtained by the heat flow sensor. In addition, the change amount of the wall surface temperature may be obtained by using the table which decides the change amount of the wall surface temperature based on the outside air temperature, the wall surface temperature, the remaining amount of the reducing agent, the reducing agent temperature, and the like by an experiment or by simulation in advance. In addition, an output destination or a transmission destination to which the output unit 66 or the transmission unit 117 outputs or transmits the prediction result or the information indicating the temperature change is not limited to the monitor 8 or the like, but may be a voice output device, a portable terminal device, or the like. In addition, in a case in which the heater tube 1 (heating unit) is configured to heat a heating wire by using the electric power of a battery mounted on the work vehicle to heat the reducing agent 2 accommodated in the reducing agent tank 3, thawing of the reducing agent 2 may be started by energizing the heating wire with the electric power of the battery in response to an instruction from the server 11. The work vehicle is not limited to the dump truck 100, and can be, for example, a general vehicle including an SCR device. In addition, the work vehicle may include the SCR device, and may be, for example, a vehicle such as a hydraulic excavator, a wheel loader, a bulldozer, or a motor grader.

INDUSTRIAL APPLICABILITY

According to the above disclosure of the present invention, it is possible to predict the time for the reducing agent to freeze or the time required for thawing the reducing agent.

REFERENCE SIGNS LIST

100: dump truck
1: heater tube
2: reducing agent
3: reducing agent tank
4: sensor module
5: wall surface temperature sensor
6: controller
8: monitor
11: server
12: engine
13: outside air temperature sensor
41: concentration sensor
42: remaining amount sensor
43: reducing agent temperature sensor
62: remaining amount information acquisition unit
63: wall surface temperature acquisition unit 64: reducing agent temperature acquisition unit
65: time calculation unit
66: output unit
133: SCR device

The invention claimed is:

1. A prediction device that predicts time for a reducing agent accommodated in a container mounted on a work vehicle to freeze, the device comprising:
the container having a heater tube therein for circulating engine coolant to heat the reducing agent in the container;
a remaining amount information acquisition unit configured to acquire remaining amount information indicating a remaining amount of the reducing agent accommodated in the container;
a wall surface temperature acquisition unit configured to acquire a wall surface temperature detection value that is a detection result of a wall surface temperature of the container;
a reducing agent temperature acquisition unit configured to acquire a reducing agent temperature detection value that is a detection result of a temperature of the reducing agent; and
a time calculation unit configured to calculate the time for the reducing agent to freeze based on the wall surface temperature detection value, the reducing agent temperature detection value, and the remaining amount information,
wherein the time calculating unit calculates the freezing prediction time during which the reducing agent drops to a freezing point temperature and is maintained in a solid-liquid coexistence region of a temperature drop curve diagram of the reducing agent,
whereby when freezing of the reducing agent in the container is detected, then circulation of the engine coolant in the heater tube is started.

2. The prediction device according to claim 1, further comprising:
an output unit configured to output the time for the reducing agent to freeze, the time being calculated by the time calculation unit, and a temporal change of the temperature of the reducing agent.

3. The prediction device according to claim 1,
wherein the prediction device is provided at a position away from the work vehicle.

4. A work vehicle comprising:
the container; and
the prediction device according to claim 1.

5. A prediction method of predicting time for a reducing agent accommodated in a container mounted on a work vehicle to freeze, the method comprising:
a step of providing the container having a heater tube therein for circulating engine coolant to heat the reducing agent in the container;
a step of acquiring remaining amount information indicating a remaining amount of the reducing agent accommodated in the container;
a step of acquiring a wall surface temperature detection value that is a detection result of a wall surface temperature of the container;
a step of acquiring a reducing agent temperature detection value that is a detection result of a temperature of the reducing agent; and
a step of calculating the time for the reducing agent to freeze based on the wall surface temperature detection value, the reducing agent temperature detection value, and the remaining amount information,
wherein the time calculating step calculates the freezing prediction time during which the reducing agent drops to a freezing point temperature and is maintained in a solid-liquid coexistence region of a temperature drop curve diagram of the reducing agent,
whereby when freezing of the reducing agent in the container is detected, then circulation of the engine coolant in the heater tube is started.

6. A prediction device that predicts time for a reducing agent accommodated in a container mounted on a work vehicle to be heated and thawed by a heating unit installed in the container, the device comprising:
the container having a heater tube therein for circulating engine coolant to heat the reducing agent in the container;
a remaining amount information acquisition unit configured to acquire remaining amount information indicating a remaining amount of the reducing agent accommodated in the container;
a wall surface temperature acquisition unit configured to acquire a wall surface temperature detection value that is a detection result of a wall surface temperature of the container;
a reducing agent temperature acquisition unit configured to acquire a reducing agent temperature detection value that is a detection result of a temperature of the reducing agent; and
a time calculation unit configured to calculate the time for the reducing agent to be thawed based on the wall surface temperature detection value, the reducing agent temperature detection value, and the remaining amount information,
wherein the time calculating unit calculates the freezing prediction time during which the reducing agent drops to a freezing point temperature and is maintained in a solid-liquid coexistence region of a temperature drop curve diagram of the reducing agents,
whereby when freezing of the reducing agent in the container is detected, then circulation of the engine coolant in the heater tube is started.

7. The prediction device according to claim 6, further comprising:
an output unit configured to output the time for the reducing agent to be thawed, the time being calculated by the time calculation unit, and a temporal change of the temperature of the reducing agent.

8. The prediction device according to claim 6,
wherein the prediction device is provided at a position away from the work vehicle.

9. A work vehicle comprising:
the container; and
the prediction device according to claim 6.

10. A prediction method of predicting time for a reducing agent accommodated in a container mounted on a work vehicle to be heated and thawed by a heating unit installed in the container, the method comprising:
a step of providing the container having a heater tube therein for circulating engine coolant to heat the reducing agent in the container;
a step of acquiring remaining amount information indicating a remaining amount of the reducing agent accommodated in the container;
a step of acquiring a wall surface temperature detection value that is a detection result of a wall surface temperature of the container;

a step of acquiring a reducing agent temperature detection value that is a detection result of a temperature of the reducing agent; and a step of calculating the time for the reducing agent to be thawed based on the wall surface temperature detection value, the reducing agent temperature detection value, and the remaining amount information, wherein the time calculating step calculates the freezing prediction time during which the reducing agent drops to a freezing point temperature and is maintained in a solid-liquid coexistence region of a temperature drop curve diagram of the reducing agent, whereby when freezing of the reducing agent in the container is detected, then circulation of the engine coolant in the heater tube is started.

11. The prediction device according to claim 2,
wherein the prediction device is provided at a position away from the work vehicle.

12. A work vehicle comprising:
the container; and
the prediction device according to claim 2.

13. The prediction device according to claim 7,
wherein the prediction device is provided at a position away from the work vehicle.

14. A work vehicle comprising:
the container; and
the prediction device according to claim 7.

* * * * *